Figure 1:
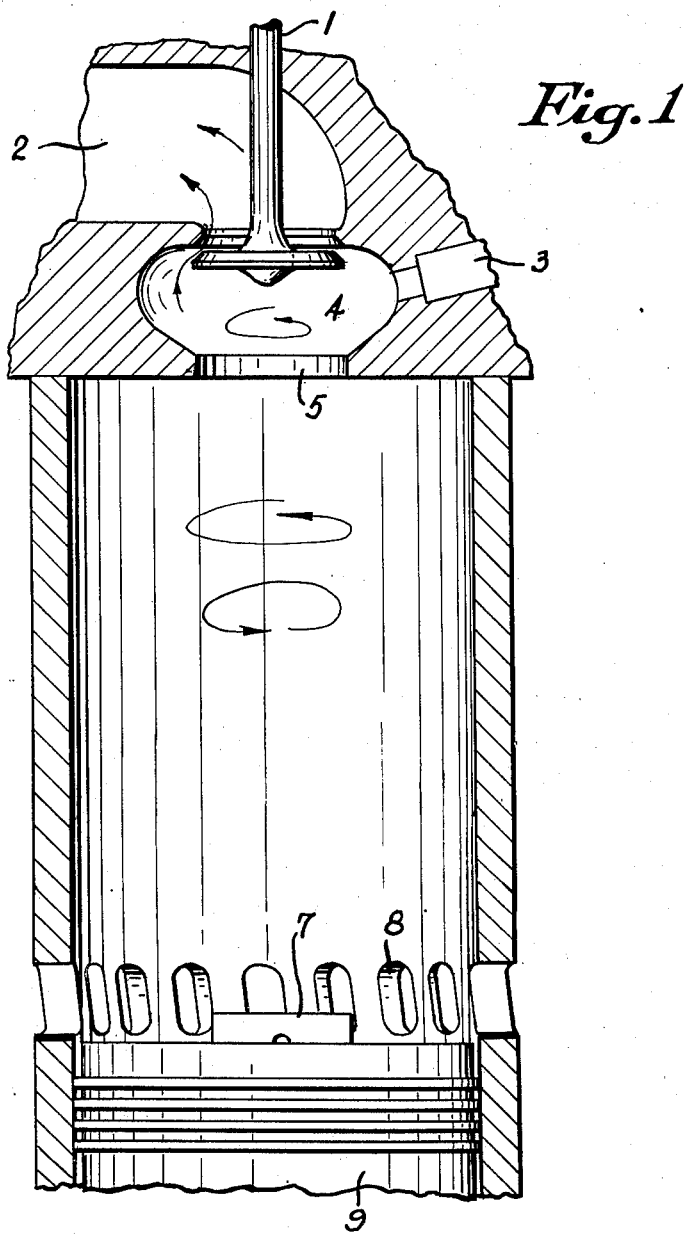

Nov. 10, 1953    N. I. BASABE    2,658,487
TWO-STROKE INTERNAL-COMBUSTION ENGINE
Filed Oct. 27, 1949    3 Sheets-Sheet 1

INVENTOR.
NICOLAS ITURBE BASABE
BY
ATTORNEYS

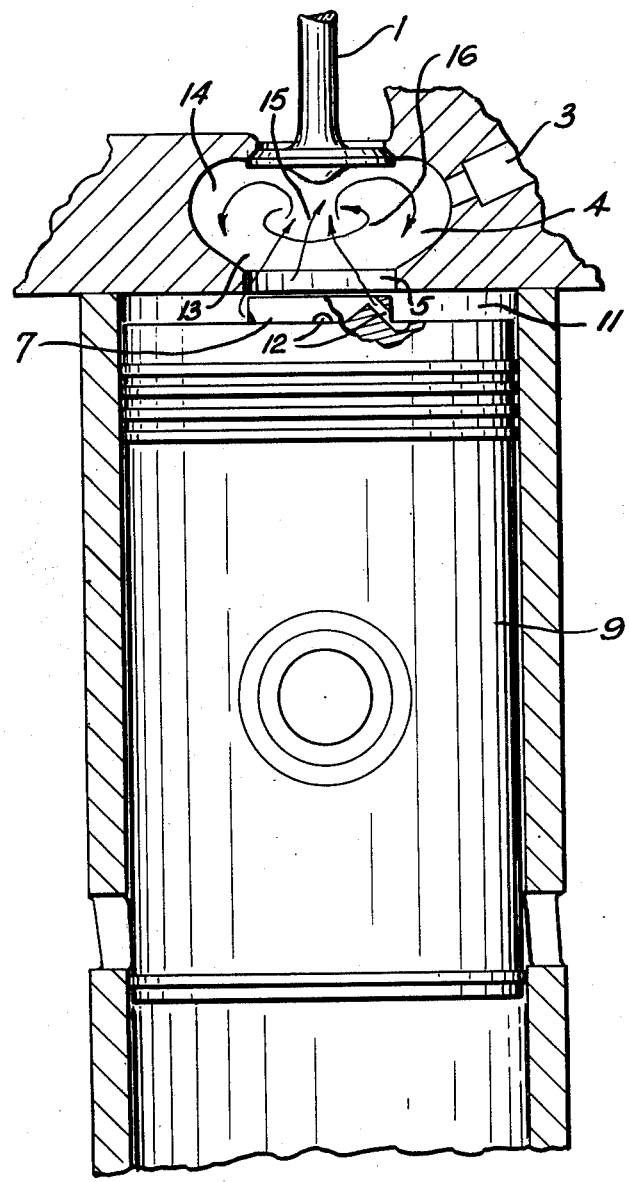

Patented Nov. 10, 1953

2,658,487

UNITED STATES PATENT OFFICE 2,658,487

TWO-STROKE INTERNAL-COMBUSTION ENGINE

Nicolás Iturbe Basabe, Cadiz, Spain

Application October 27, 1949, Serial No. 123,803
Claims priority, application Spain May 10, 1949

1 Claim. (Cl. 123—32)

This invention relates to two-stroke internal combustion engines and has for one of its objects to provide means for promoting a triple turbulence of the combustible charges by imparting a swirling motion to entering air or gases, and by providing a combustion chamber in the cylinder head wherein turbulence in two other senses is created by virtue of the form of the combustion chamber, and with the aid of a specially shaped piston crown controlling the final transfer of air or gases from the cylinder into said chamber.

The invention accordingly provides means in or for a two-stroke internal combustion engine for promotion of turbulence of the combustible charges, comprising the combination of a cylinder head having a substantially toric compression chamber, in which are locatable fuel injection or ignition means and at least one exhaust valve, said chamber having an opening to the cylinder, with a projection on the piston crown adapted on the approach of the piston to its outer dead centre to enter said opening for controlling flow of air and/or gases between the compression chamber and the cylinder.

The means afforded by the invention effect a highly efficient turbulence of the combustion charges, ensuring perfect mixing of the fuel vapour and air, while the entry of the projection on the piston crown into said chamber creates during the final portion of the piston displacement (in the case of a compression ignition engine) jets of air into said chamber at a very high temperature so as to enable ignition of the fuel without a very high degree of compression, and a very high mean effective pressure with very low full pressures, and a noticeable economy of fuel.

The projection on the piston crown may be provided with ducts extending at an inclination from the lateral walls of said projection to the outer transverse surface thereof, for the transfer of the last volumes of air from the space between the piston crown and cylinder head to the combustion chamber after the commencement of entry of said projection into the opening of the chamber.

Further, there may be disposed about the junction of the lateral walls of said projection with the piston crown surface an annular recess of semi-circular or like cross section which serves after ignition to divert the expanding gases pressing through the annular gap between the said projection and the wall of the opening into the combustion chamber (and also through the aforesaid ducts if provided) into an outward direction of movement against the cylinder head surface, thus forming eddies and preventing premature levelling of pressure between the combustion chamber and the cylinder.

Figure 4:
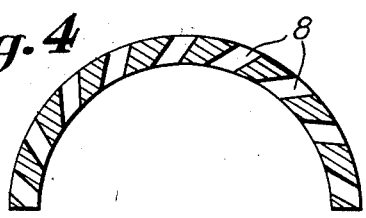
Figure 3:
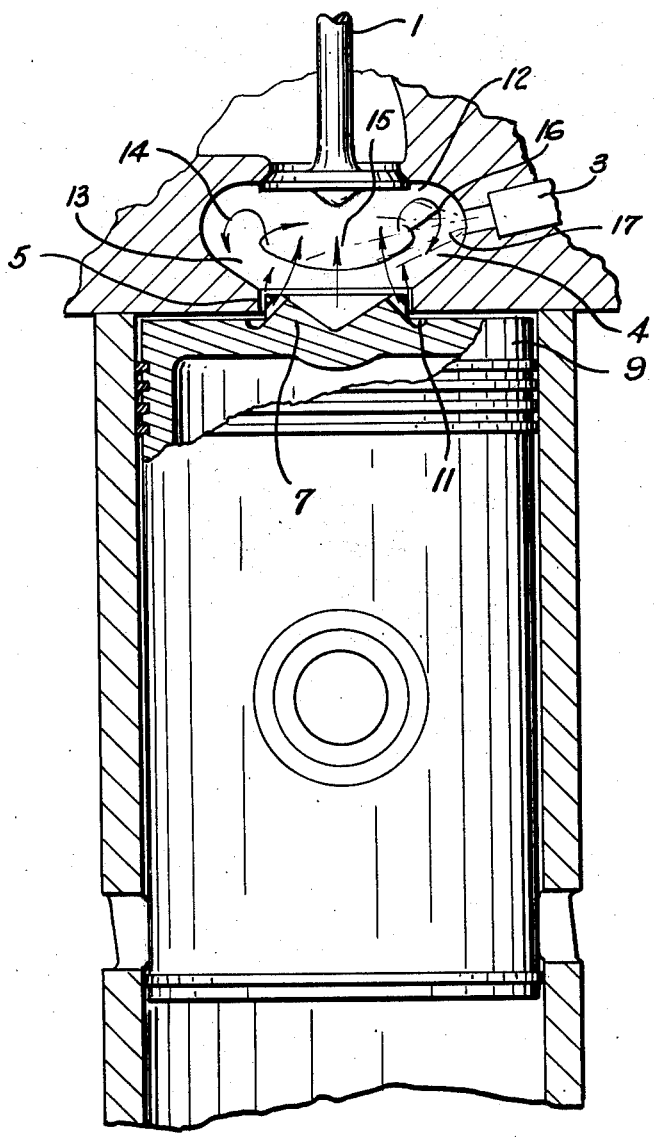

The foregoing and other features of the invention will be apparent from the following description by way of example of one embodiment thereof, with reference to the accompanying drawings, wherein:

Figure 1 is an axial cross section of an engine cylinder having means according to the invention, showing the piston at its inner dead centre, Figure 2 is a similar view showing the piston approaching its outer dead centre, before commencement of entry of the projection thereon into the opening of the combustion chamber, Figure 3 is a similar view showing the piston at its outer dead centre, and Figure 4 is a partial transverse section of the device shown in Figure 1.

In the relative positions as shown in Figure 1, the exhaust valve 1 is open to permit discharge of completely burnt gases to an exhaust duct 2 from the cylinder by way of a combustion chamber 4 in which is also located an injector 3. At its inner dead centre, as shown, the piston 9 uncovers annular series of intake ports 8 which as shown in Figure 4 are provided at an inclination in a transverse plane to radii of the cylinder, so as to impart a swirling motion to entering air which enhances the scavenging effect of said air in expelling the previously burnt gases from the cylinder, and also maintains a swirling motion of the air after the closing of the exhaust valve and during the compression of the air into the combustion chamber 4.

The combustion chamber 4 is substantially toric in axial cross section, and the projection on the piston crown, which is co-axial with and adapted to enter an opening 5 from said chamber to the cylinder, has its upper surface made concave, as will be more clearly seen in Figure 3, to define with the torus in the cylinder head a heart-shaped axial section for the combustion chamber. The exhaust valve 1 is also located co-axially and has an exposed surface which is formed with a boss as shown to assist in defining said heart-shaped section.

When in the course of the compression stroke the piston attains the position shown in Figure 2, the passage area for air from the cylinder to the compression chamber is sharply reduced on the commencement of entry of the projection 7 on its crown into the opening 5. The said projection, however, has a series of radial ducts 12 extending at an upward inclination from the lateral walls of the projection to the outer surface thereof, which ducts continue to afford passage for air into the combustion chamber until the piston actually attains its outer dead centre as shown in Figure 3. Air passing through these ducts creates a turbulence in the sense indicated by arrows 14 (in the manner of a fountain) which is superimposed on the rotatory turbulence above mentioned and indicated by arrow 16, while a supplementary transfer of air through the gap between the lateral wall of the projection and the corresponding wall of the opening 5 imparts additional turbulence as indicated by arrows 13.

The jets 15 of air introduced by way of ducts 12 attain a very high temperature and when fuel is injected by the injector 3 in a spray as indicated at 17, ignition occurs with a high elevation of pressure inside chamber 4.

There is also disposed around the junction of the lateral walls of the projection 7 with the crown surface of the piston, an annular recess 11 of semi-circular radial section. On ignition, the high pressure of the combustion is initially applied only to the exposed surface of the projection 7 and the transmission of this high pressure instantaneously to the full area of the piston is prevented for the reason that the combustion products initially have access to the cylinder only by way of the ducts 12 and the annular space around the projection.

The annular recess 11 then serves to divert these gases through a semi-circular movement to an upward direction, forming eddies and effecting gradual transfer of the combustion pressure to the piston crown, while at the same time preventing the escape of fuel vapours before these have been completely mixed with air and burnt.

Evidently, by the novel means which the invention affords, an internal combustion engine is enabled to create a perfect and highly turbulent mixture of fuel and air capable of attaining a very high pressure on ignition in the combustion chamber, independently of the working pressure which is most appropriate for the cylinder and the piston when the latter is still adjacent its outer dead centre, thereby tending to ensure smooth running of the engine, easy starting when cold, economy of fuel, completely colourless exhaust, and long life for the lubricating oil and the components of the engine.

Evidently, means as described may be applied in any convenient disposition to engines having one or a plurality of cylinders. The means may further be modified by the provision of a plurality of exhaust valves and/or a plurality of injectors, the combustion chamber and the projection on the piston being suitably modified to accommodate such elements, as may be desirable or convenient, without exceeding the scope of the invention.

Having now particularly described and ascertained the nature of my said invention and in what manner the same is to be performed, I declare that what I claim is:

In a two-stroke internal combustion engine, in combination, a hollow cylinder, means having walls forming a heart-shaped compression chamber located at one end of the cylinder, and means forming a restricted passage connecting said compression chamber with said end of the cylinder interior, an exhaust valve located in the middle of that wall of said compression chamber which is opposite said passage, an injector located on one side of said compression chamber, and a piston reciprocable within said cylinder and having a projection fitting into said passage at the outer dead center position of the piston, said projection having ducts extending from the side walls of the projection to the top surface thereof, said piston having an annular recess formed therein and located substantially at the juncture of the side walls of said projection with the top surface of said piston and communicating with said ducts, said cylinder having intake ports formed therein and adapted to be uncovered by said piston at and about its inner dead center position, said ports being inclined in a transverse plane to the radii of the cylinder.

NICOLÁS ITURBE BASABE.

References Cited in the file of this patent

UNITED STATES PATENTS

| Number | Name | Date |
|---|---|---|
| 1,450,567 | Tartrais | Apr. 3, 1923 |

FOREIGN PATENTS

| Number | Country | Date |
|---|---|---|
| 207,643 | Great Britain | Dec. 6, 1923 |
| 821,488 | France | Dec. 6, 1937 |
| 522,015 | Great Britain | June 6, 1940 |
| 881,187 | France | Jan. 15, 1943 |